(12) United States Patent
Sakwa

(10) Patent No.: US 10,057,914 B2
(45) Date of Patent: Aug. 21, 2018

(54) BLUETOOTH DEVICE AND DATA SCHEDULER

(71) Applicant: Uber Technologies, Inc., San Francisco, CA (US)

(72) Inventor: Joshua Sakwa, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

(21) Appl. No.: 15/706,036

(22) Filed: Sep. 15, 2017

(65) Prior Publication Data
US 2018/0007706 A1    Jan. 4, 2018

Related U.S. Application Data

(63) Continuation of application No. 14/853,728, filed on Sep. 14, 2015, now Pat. No. 9,801,202.

(51) Int. Cl.
| H04W 72/12 | (2009.01) |
| H02J 1/00 | (2006.01) |
| G06F 1/00 | (2006.01) |
| H04B 1/3883 | (2015.01) |
| H04L 12/865 | (2013.01) |
| H04L 29/08 | (2006.01) |
| H04W 4/00 | (2018.01) |
| H04W 4/80 | (2018.01) |
| H04W 84/18 | (2009.01) |

(52) U.S. Cl.
CPC .......... *H04W 72/1242* (2013.01); *G06F 1/00* (2013.01); *H02J 1/00* (2013.01); *H04B 1/3883* (2013.01); *H04L 47/6275* (2013.01); *H04L 67/12* (2013.01); *H04W 4/008* (2013.01); *H04W 4/80* (2018.02); *H04W 84/18* (2013.01)

(58) Field of Classification Search
CPC .......................... H04W 72/1242; H04W 4/008
See application file for complete search history.

(56) References Cited

U.S. PATENT DOCUMENTS

| 8,887,212 B2 | 11/2014 | Dua | |
| 2012/0163520 A1 | 6/2012 | Liu | |
| 2014/0297225 A1* | 10/2014 | Petroski | H04B 13/02 702/188 |
| 2015/0032237 A1 | 1/2015 | Roebke | |
| 2015/0350750 A1* | 12/2015 | Yun | H04Q 9/00 340/870.07 |

* cited by examiner

Primary Examiner — Tuan H Nguyen
(74) Attorney, Agent, or Firm — Mahamedi IP Law LLP

(57) ABSTRACT

A method and device for wireless data transmission are described. A device receives sets of sensor data associated with respective sensor measurements for a vehicle. The device determines a priority for each of the sets of sensor data based on an amount of data stored for that sensor measurement in a number of data queues, and selectively stores each of the sets of sensor data in one of the data queues based on a threshold data throughput rate of a wireless network and the priority of each set of sensor data. The device transmits, to a second computing device via the wireless network, at least some of the sets of sensor data from the data queues based on a current data throughput rate of the wireless network and a priority level of each of the data queues.

14 Claims, 8 Drawing Sheets

BLUETOOTH DEVICE AND DATA SCHEDULER

CROSS REFERENCE TO RELATED APPLICATION

The application is a continuation of U.S. patent application Ser. No. 14/853,728, entitled "Bluetooth Device and Data Scheduler," and filed on Sep. 14, 2015; which priority application is hereby incorporated by reference in its entirety.

BACKGROUND

An on-demand service system can arrange for an on-demand service to be provided for a requesting user by a service provider. In some examples, the service provider's automobile may be equipped with various on-board sensors. These sensors may draw power from the service provider's automobile and may communicate wirelessly with a mobile handset to relay sensor data to a server associated with the on-demand service system. The on-demand service system may use the sensor data to monitor the status, and/or location, of its service providers.

DETAILED DESCRIPTION

Figure 1:
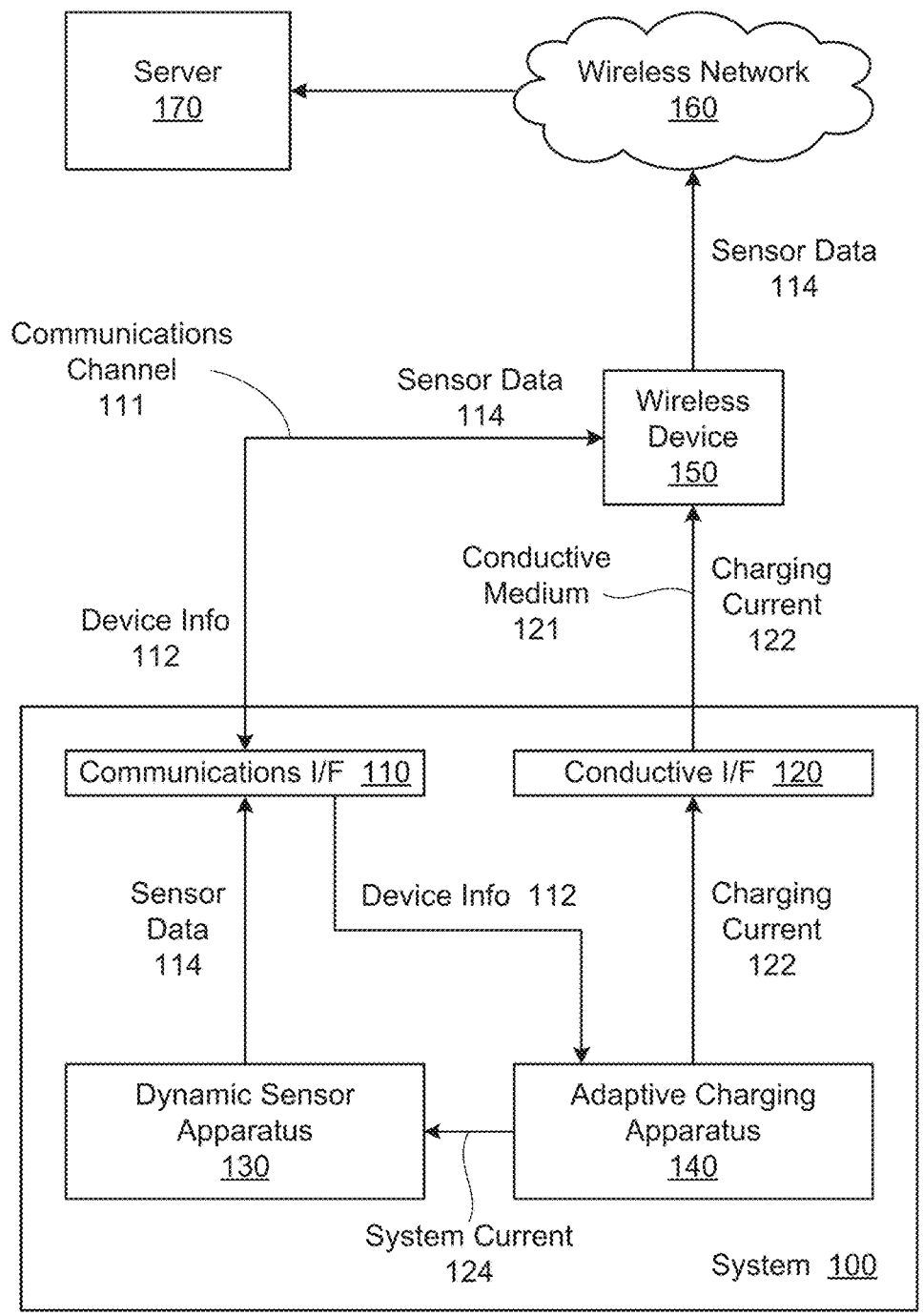
FIG. 1 illustrates an example wireless communication system for use with an on-demand service.

Examples described herein provide for a system that can communicate wirelessly with a mobile device and may dynamically adjust one or more parameters to accommodate the mobile device based on the wireless communication. The system may be used in an on-demand service environment to enable and/or facilitate communications between a provider device and a server that controls and/or manages the on-demand service.

In some aspects, the system may include a charging component (e.g., a Universal Serial Bus (USB) receptacle) to provide a charging current to charge the provider device. The system can detect a device type of the provider device and may provide a charging current that is optimized for the particular device type. In other aspects, the system may include a plurality of sensors (e.g., global positioning satellite (GPS), inertial measurement unit (IMU), altimeter, and/or light sensors) to provide sensor information, via the provider device, to the server of the on-demand service. Due to variations in the bandwidth of communications between the system and the provider device, the system may dynamically adjust (e.g., throttle) the amount and/or type of sensor data transmitted to the provider device based on the available bandwidth at any given time.

According to some examples, a charging apparatus includes a power delivery circuit to provide power to a wireless device, a wireless radio to communicate wireless with the wireless device, and a controller. The controller may receive information about the wireless device via the wireless radio, and may control an amount of current provided to the wireless device by the power delivery circuit based at least in part on the received information. For example, the information about the wireless device may include at least a device type. Thus, the amount of current provided by the power delivery circuit, when powering the wireless device, may be based on the device type. The power delivery circuit may include a primary connection feature to be coupled to an external power source and a Universal Serial Bus (USB) receptacle to be coupled to the wireless device. The power provided to the wireless device may be sourced from the external power source via the primary connection feature and delivered to the wireless device via the USB receptacle.

In some aspects, the controller may determine, based on the received information, whether the device type is one of a plurality of recognized device types. If the device type is one of the plurality of recognized device types, the controller may enable the power delivery circuit to provide a first amount of current to the wireless device. For example, the first amount of current may be optimized for the device type. More specifically, the first amount of current may exceed a charging current defined by the USB specification. If the device type is not one of the plurality of recognized device types, the controller may throttle the amount of current provided to the wireless device. For example, the throttled current may be less than the first amount. More specifically, the throttled current may be less than or equal to the charging current defined by the USB specification.

According to other examples, a sensor apparatus includes a plurality of sensors to generate sensor data, and a scheduler to dynamically schedule transmission of sensor data from each of the plurality of sensors to a wireless device, via a first wireless network, based at least in part on a bandwidth of the first wireless network and a priority of the sensor data. Specifically, the bandwidth of the first wireless network may vary over time. For example, the first wireless network may be a Bluetooth Low Energy (BLE) network.

In some aspects, the sensor apparatus may include a first data queue to store a first set of sensor data for each of the plurality of sensors, and a second data queue to store a second set of sensor data for one or more of the plurality of sensors. The second set of sensor data may have a lower priority than the first set of sensor data. The scheduler may schedule the first set of sensor data to be transmitted to the wireless device based on a minimum guaranteed bandwidth associated with the first wireless network. For example, the minimum guaranteed bandwidth may be a preconfigured value and/or determined by the scheduler. On the other hand, the scheduler may schedule sensor data form the second set to be transmitted to the wireless device only when the bandwidth of the first wireless network exceeds the minimum guaranteed bandwidth.

Among other benefits and advantages, examples as described may leverage the wireless communications between the system and the provider device to detect a device type of the provider device, and to enable faster charging of the provider device based on the device type. Further, the examples herein may ensure that sensor data from each of a plurality of sensors is transmitted wirelessly to a receiving device at a minimum guaranteed throughput, and that additional sensor data may be transmitted only when additional bandwidth is available on the wireless channel.

As used herein, a "driver," a "provider," a "service provider," a "supplier," or a "vendor," are invariably used to refer to individuals or entities that can provide an on-demand service. Also, as used herein, a "client device," a "driver device," and/or a "computing device" refer to devices corresponding to desktop computers, cellular devices or smartphones, personal digital assistants (PDAs), laptop computers, tablet devices, television (IP Television), etc., that can provide network connectivity and processing resources for communicating with a notification system and/or a transport arrangement system over a network. A driver device can also correspond to other devices of a transit object, such as an in-vehicle computing system, or custom hardware, etc. The driver device can also operate a designated service application that is configured to communicate with the on-demand service system and/or the transport personalization system. Still further, while some examples described herein relate to transport services, the systems describe herein can be used to provide other on-demand services, such as a food truck service, a delivery service, an entertainment service, etc.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example wireless communication system 100 for use with an on-demand service. Depending on implementation, one or more components of the system 100 can be implemented on a computing device, such as a server, laptop, PC, etc., or on multiple computing devices that can communicate with a wireless device 150 and server 170 over one or more networks. In some examples, a computing device can operate or execute an application to perform one or more of the processes described by the various components of the system 100. The system 100 can also be implemented through other computer systems in alternative architectures (e.g., peer-to-peer networks, etc.).

As described herein, the system 100 can be a part of or communicate with an on-demand service system, such as a transport arrangement system (e.g., implemented by the server 170) of the on-demand service system. Examples of an on-demand service can include a transport service, a food truck service, a delivery service, a traveling entertainment service, etc. A transport arrangement system for a transport service, for example, can receive requests from users operating client devices and arrange for transport services to be provided to the users by service providers (e.g., drivers). The wireless device 150 can provide current or real-time information about a particular driver (e.g., that owns and/or operates the wireless device 150) and/or vehicle (e.g., used by the driver for providing on-demand services) to the transport arrangement system and/or the system 100, and based, at least in part, on the information, the transport arrangement system can determine the pricing for the transport service in a given geographic region, can select a driver for a requesting user, can determine if the transport service has been successfully completed, etc.

For example, the wireless device 150 may operate a service application that can communicate with the server 170, via a wireless network 160, to provide on-demand services. In some examples, the wireless network 160 may be a cellular communications network (e.g., GSM, 3G, 4G, LTE, etc.). The service application may enable data to be exchanged between the server 170 and the wireless device 150 so that a user of the wireless device 150 (e.g., service provider) can view service-oriented content provided by the server 170, and the server 170 can monitor information about the user of the wireless device 150.

According to implementations, the system 100 includes a communications interface 110, a conductive interface 120, a dynamic sensor apparatus 130, and an adaptive charging apparatus 140. The system 100 can communicate (e.g., exchange data), over a communications channel 111, with the wireless device 150 using the communications interface 110. The communications channel 111 may be a wired or wireless communications channel. In some examples, the communications channel 111 may correspond to one or more channels of a Bluetooth Low Energy (BLE) network. The system 100 may be coupled to, or otherwise provided in, a vehicle used by the service provider for providing on-demand services. In some aspects, the system 100 may use the wireless device 150 as a proxy to upload information about the service provider's vehicle to the server 170 of the on-demand service system. The on-demand service system may use the vehicle information to generate and/or update the service-oriented content provided to the wireless device 150 (e.g., by matching customers with the service provider). For example, the vehicle information may include sensor data 114 collected by the dynamic sensor apparatus 130. As described herein, the dynamic sensor apparatus 130 can be a device that is positioned in and/or coupled to a vehicle driven by the service provider.

The dynamic sensor apparatus 130 may include one or more sensors (e.g., global positioning satellite (GPS), inertial measurement unit (IMU), altimeter, light sensors, etc.) to detect a current state and/or status of the service provider's vehicle. For example, a GPS module may generate location and/or position information that may be used to detect the whereabouts of the service provider's vehicle. An IMU sensor may generate velocity, orientation, and/or gravitational information that may be used to detect the vehicle's bearing and/or calculate an estimated arrival time. The dynamic sensor apparatus 130 outputs the sensor data 114 to the communications interface 110, which transmits the sensor data 114 via the communications channel 111 to the wireless device 150. The wireless device 150 then uploads the sensor data 114 to the server 170 via the wireless network 160.

The wireless network 160 (e.g., a cellular network) may have significantly greater bandwidth than the communications channel 111 (e.g., a BLE network). Thus, the communications channel 111 may create a bottleneck in the transmission of sensor data 114 to the server 170. Moreover, because BLE relies on relatively low-power short-range radio communications, the available bandwidth in a BLE network may vary. For example, the properties of the wireless device 150, distance between the wireless device 150 and the communications interface 110, and/or characteristics of the communications channel 111 (e.g., noise, interference, etc.) may affect the bandwidth of the BLE network at any given time. Thus, depending on the number of sensors and/or the amount of sensor data generated by each sensor of the dynamic sensor apparatus 130, there may not be enough bandwidth in the communications channel 111 to upload sensor data from all of the sensors at the rate at which such sensor data is generated.

In some examples, the dynamic sensor apparatus 130 may dynamically adjust (e.g., throttle) the amount and/or type of sensor data 114 transmitted to the wireless device 150 based, at least in part, on the amount of available bandwidth in the communications channel 111. For example, the dynamic sensor apparatus 130 may increase the amount of sensor data 114 transmitted to the wireless device 150 when the channel conditions provide for more available bandwidth, and may reduce the amount of sensor data 114 transmitted to the wireless device 150 when the channel conditions provide for less available bandwidth. In some aspects, the dynamic sensor apparatus 130 may ensure that at least a threshold amount of sensor data 114 is transmitted to the wireless device 150 based on a "minimum guaranteed bandwidth" of the communications channel 111. For example, the minimum guaranteed bandwidth may correspond to a threshold amount of bandwidth that the communications channel 111 is guaranteed to provide (e.g., the bandwidth of the communications channel 111 rarely, or never, drops below that threshold).

In some aspects, the system 100 may be coupled to the wireless device 150 via the conductive interface 120. For example, the system 100 may provide a charging current 122 to the wireless device 150 via a conductive medium 121 (e.g., a USB, mini-USB, or micro-USB connection) that couples and/or connects the wireless device 150 to the conductive interface 120. For example, the charging current 122 may be used to power and/or charge a battery of the wireless device 150. The charging current 122 may be provided, at least in part, by the adaptive charging apparatus 140. Although not shown, for simplicity, the adaptive charging apparatus 140 may also provide power to other components of the wireless communications system 100 (e.g., such as the dynamic sensor apparatus 130). In some aspects, the adaptive charging apparatus 140 may deliver a charging current 122 that is optimized for the wireless device 150.

Different types of wireless devices may have different (e.g., proprietary) charging specifications. For example, the amount of charging current 122 that a particular wireless device can handle may depend on the type of battery and/or other circuitry used in the device. The USB specification, for example, defines a standard charging current (e.g., 500 mA) that should be supported by all USB-compatible devices. Certain device manufacturers may allow their devices to draw more power (e.g., beyond the standard charging current defined by the USB specification), and thus charge faster, when connected to a device-specific "high speed" charger. However, to prevent potentially overloading the circuitry of other devices, the device-specific high speed charger may provide a much lower charging current when connected to a non-recognized device type.

For example, a charger designed specifically for the iPhone® may supply a very high charging current (e.g., >2 A) when connected to an iPhone device, but may supply a much lower charging current (e.g., 500 mA) when connected to a mobile device based on the Android™ mobile platform, even though the Android-based device may be capable of drawing significantly more power (e.g., when connected to an Android-specific charger). This is because a conventional iPhone charger does not "know" how much current the Android device is capable of drawing. Thus, if the charger is unable to complete a "handshake" with (or otherwise recognize) the connected device, it may simply provide a default charging current (e.g., the standard charging current defined by the USB specification) that is likely, if not guaranteed, to be supported by the connected device.

In some examples, the wireless device 150 may communicate device information 112 to the system 100 via the communications channel 111. For example the device information 112 may include any information communicated in one or more data packets that can be used to identify the wireless device 150 and/or the type of device (e.g. device ID, serial number, media access control (MAC) address, etc.). The adaptive charging apparatus 140 may receive the device information 112 via the communications interface 110 and/or via other circuitry coupled to the communications interface 110 (e.g., such as the dynamic sensor apparatus 130), and may determine a charge profile for the wireless device 150. The charge profile may indicate one or more charging currents that are supported by the particular device and/or device type (e.g., which may include similar devices produced by the same manufacturer). The adaptive charging apparatus 140 may then select highest-supported charging current 122 by the wireless device 150 to be delivered to the wireless device 150 via the conductive interface 120. In some examples, the adaptive charging apparatus 140 may also supply a system current 124 to power the dynamic sensor apparatus 130 and/or other components of the system 100.

Adaptive Charging Apparatus

Figure 2:
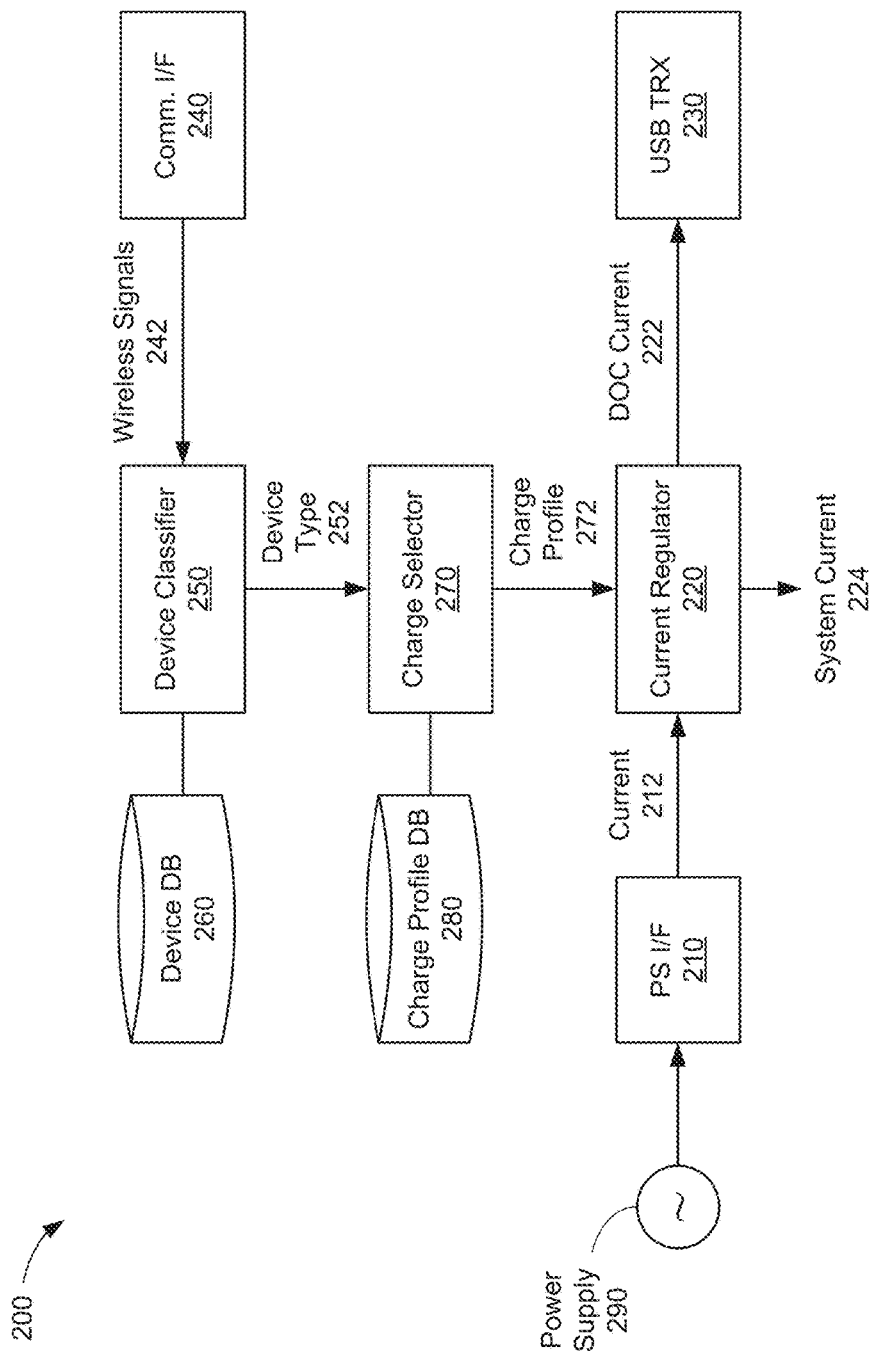
FIG. 2 illustrates an example charging apparatus that can provide a device-optimized charging current to a wireless device based on the type of device.

FIG. 2 illustrates an example charging apparatus 200 that can provide a device-optimized charging current to a wireless device based on the type of device. The charging apparatus 200 may be an embodiment of the adaptive charging apparatus 140 of FIG. 1. The charging apparatus 200 includes a power source (PS) interface 210, a current regulator 220, a USB transceiver (TRX) 230, a communications interface 240, a device classifier 250, a device database (DB) 260, a charge selector 270, and a charge profile database (DB) 280.

The PS interface 210 is coupled to, and receives power from, a power supply 290. Although the power supply 290 is shown as being part of the charging apparatus 200, in FIG. 2, in other examples, the power supply 290 may be external to the charging apparatus 200. The current regulator 220 receives a current 212 from the power supply 290, via the PS interface 210, and provides a device-optimized charging (DOC) current 222 to the USB transceiver 230. In some aspects, the DOC current 222 may be optimized (e.g., to provide high-speed charging) for a device, such as the wireless device 150 of FIG. 1, coupled to the USB transceiver 230 (not shown for simplicity). Still further, although not illustrated in FIG. 2 for purposes of simplicity, in another example, the current regulator 220 can provide a second current to another device, such as the dynamic sensor apparatus 130 of FIG. 1, via a conductive medium (e.g., a wire or cable).

A conventional USB transceiver typically performs a hardware handshake with a connected device to determine the data and/or charging capabilities of the device. For example, the conventional USB transceiver may determine which version(s) of the USB specification the connected device supports. The conventional USB transceiver may also use the handshake to determine whether the connected device supports a proprietary charging specification that exceeds the amount of charging current defined by the USB specification. For example, the USB transceiver of an iPhone charger may detect whether the connected device is an iPhone, and thus capable of receiving a charging current of over 2 A. However, conventional USB transceivers are typically preconfigured to recognize only a single device type, and may thus provide only a single proprietary high-speed charging current (e.g., in addition to the standard charging currents defined by the USB specification).

In example implementations, rather than rely on a USB handshake operation, the charging apparatus 200 may determine the charging specifications for the connected device in a different manner, such as by leveraging an existing connection with the connected device to determine the DOC current 222. For example, the connected device may be in wireless communication with the communications interface 240 to receive sensor data from a sensor apparatus coupled to the charging apparatus 200 (e.g., sensor apparatus 130 of FIG. 1).

The device classifier 250 receives a set of wireless signals 242 from the connected device via the communications interface 240. In some examples, the communications interface 240 may be a BLE transceiver used to receive and/or transmit BLE signals (e.g., wireless signals 242). The device classifier 250 may identify a type of device that sent the wireless signals 242 based on information contained in the wireless signals 242. For example, the wireless signals 242 may include device information (e.g., device ID, serial number, MAC address, etc.) identifying the device from which the wireless signals 242 originated. In some aspects, the device classifier 250 may look up the device information in the device database 260 to identify a device type 252.

The device type 252 may correspond with a particular product (e.g., iPhone), class of products (e.g., mobile phones), family of products (e.g., Apple® products), and/or any other form of device classification. The charge selector 270 may select a charge profile 272 based on the device type 252. In some aspects, the charge selector 270 may look up the device type 252 in the charge profile database 280 to determine the charge profile 272. The charge profile 272 may include current, voltage, and/or other power-related specifications for the given device type 252.

The current regulator 220 selectively outputs the DOC current 222 for the connected device based on the charge profile 272. In some examples, the current regulator 220 may output the highest amount of current that the connected device is capable of supporting (e.g., as indicated by the charge profile 272). For example, this amount may exceed the standard charging current defined by the USB specification (e.g., 500 mA). For other embodiments, the current regulator 220 may enable the connected device to draw a greater amount of current (e.g., based on the charge profile 272) from the USB transceiver 230 than the USB specification would otherwise allow. Further, in some examples, the current regulator 220 may also supply power to one or more components of the charging apparatus 200 and/or additional circuitry coupled to the charging apparatus 200 (e.g., the dynamic sensor apparatus 130 of FIG. 1) via a system current 224.

In some instances, the charging apparatus 200 may not recognize the connected device. For example, the device classifier 250 may be unable to identify a device type of the connected device based on the received wireless signals 242 (e.g., the device database 260 does not contain device information for the connected device). Thus, the device classifier 250 may output a "default" or null value for the device type 252. The charge selector 270 may similarly output a default or null value for the charge profile 272, which causes the current regulator 220 to provide a standard charging current to the USB transceiver 230. For example, the standard charging current may correspond with an amount of charging current defined by one or more versions of the USB specification, which is likely to be supported by the connected device.

Further, in some aspects, the charging apparatus 200 may be dynamically updated to recognize new devices and/or device types. For example, when a new mobile device come to market (e.g., with a new proprietary charging specification), the charging apparatus 20 may be programmatically updated by storing a new device type 252, to be associated with device information identifying the new mobile device, in the device database 260, and storing a new charge profile 272 associated with the new device type 252 in the charge profile database 280. In this manner, the charging apparatus 200 may be able to provide high-speed charging for a wide variety of current, legacy, and future devices.

Dynamic Sensor Apparatus

Figure 3:
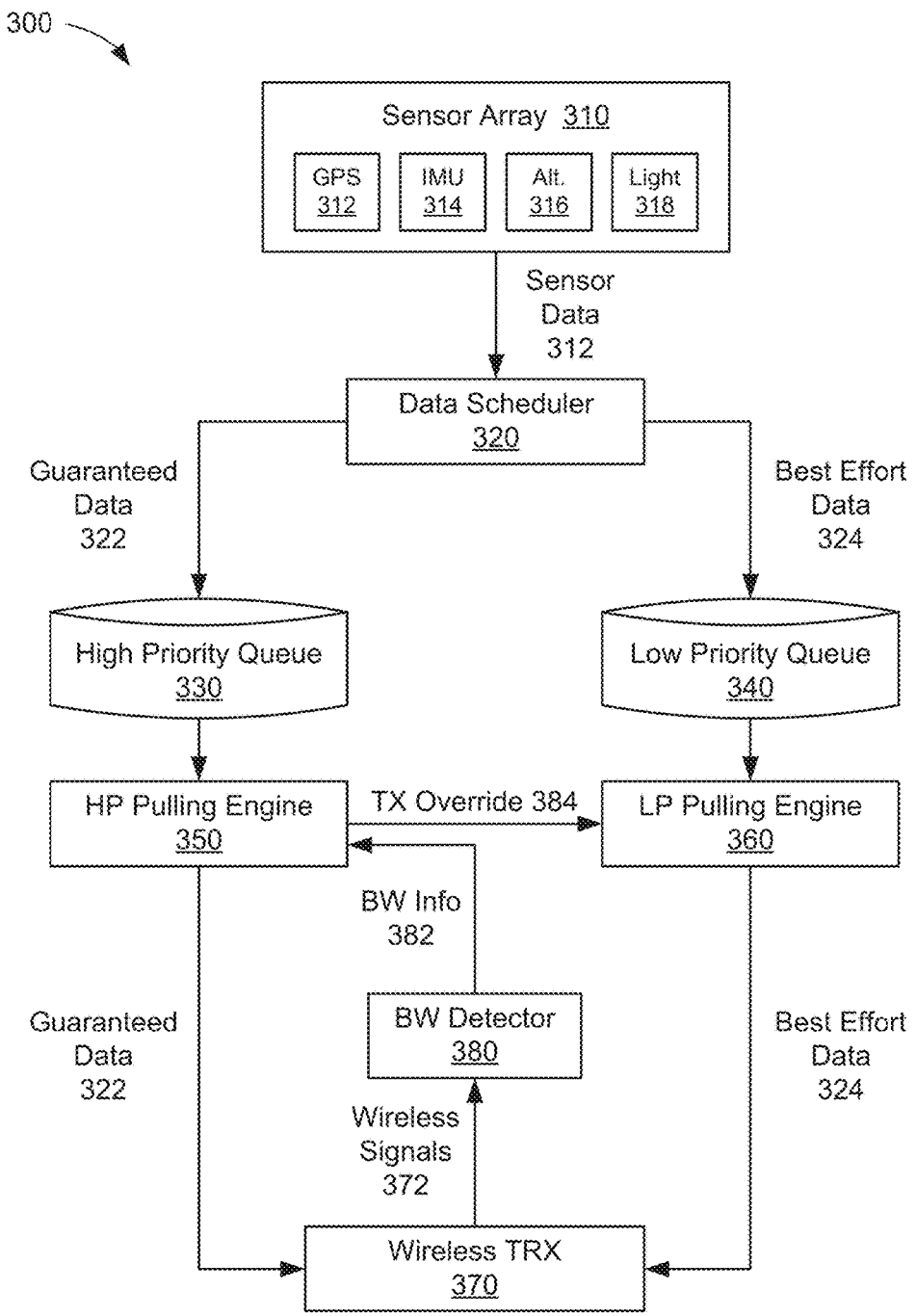
FIG. 3 illustrates an example sensor apparatus that can dynamically adjust the amount and/or type of sensor data to be transmitted to a wireless device based on varying channel conditions.

FIG. 3 illustrates an example sensor apparatus 300 that can dynamically adjust the amount and/or type of sensor data to be transmitted to a wireless device based on varying channel conditions. The sensor apparatus 300 is an example of the dynamic sensor apparatus 130 of FIG. 1. The sensor apparatus 300 includes a sensor array 310, a data scheduler 320, a high priority queue 330, a low priority queue 340, a high-priority (HP) pulling engine 350, a low-priority (LP) pulling engine 360, a wireless transceiver (TRX) 370, and a bandwidth (BW) detector 380.

The sensor array 310 may include a plurality of sensors 312-318 that can sense or detect one or more characteristics of their environment and generate sensor data 312 based on the detected characteristics. In an example implementation, the sensor array 310 includes a GPS module 312, an IMU sensor 314, an altimeter 316, and a light sensor 318. The GPS module 312 may detect a location and/or position of the sensor apparatus 300. The IMU sensor 314 may detect a velocity, orientation, and/or gravitational pull of the sensor apparatus 300. The altimeter 316 may detect a height or altitude of the sensor apparatus 300. The light sensor 318 (e.g., photodetector) may detect an amount and/or intensity of light reaching the sensor apparatus 300.

Each of the plurality of sensors 312-318 may generate its own subset of sensor data 312 with varying data sizes and/or frequencies. In some aspects, one or more of the sensors 312-318 may periodically generate new or updated sensor data 312 (e.g., at regular intervals of time). For example, it may be desirable for an on-demand service to track a service provider's vehicle at any given time (e.g., and to know whether the vehicle is moving, stopped at a red light, stuck in traffic, and/or parked). Thus, the GPS module 312 may periodically update the location information, regardless of whether the location information has changed.

In other aspects, one or more of the sensors 312-318 may generate updated sensor data 312 in response to changes in the surrounding environment. For example, a vehicle driven in the daytime will typically be exposed to substantially the same amount of light for the majority of the day (e.g., unless the vehicle passes through a tunnel or an underground parking structure and/or the weather has changed). Thus, the light sensor 318 may update the lighting information only when it detects a change in the amount and/or intensity of light in the surrounding environment (e.g., when the amount and/or intensity of light crosses a threshold).

The data scheduler 320 schedules the sensor data 312 for transmission by the wireless transceiver 370. In some implementations, the wireless transceiver 370 may be a BLE transceiver for communicating over a BLE network. Due to the relatively low bandwidth of the wireless network (e.g., the BLE network) and variability in the amount of available bandwidth, the amount of sensor data 312 generated by the sensor array 310 may exceed the available bandwidth of the BLE network at any given time. Thus, in some examples, the data scheduler 320 may organize the sensor data 312 into two or more service classes including, at least, a "guaranteed" service class and a "best effort" service class.

The data scheduler 320 may allocate a portion of the sensor data 312 to the guaranteed service class (e.g., as guaranteed data 322) based on a minimum guaranteed bandwidth of the wireless network. The remainder of the sensor data 312 may thus be allocated to the best effort service class (e.g., as best effort data 324). For example, if the data scheduler 320 receives sensor data 312 from the sensor array 310, while the guaranteed service class is full, the data scheduler 320 may assign this "additional" sensor data to the best effort service class. In another example, the data scheduler 320 may assign additional sensor data to the best effort service class if the guaranteed service class already contains sensor data originating from the same sensor 312, 314, 316, or 318 as the additional sensor data (e.g., the corresponding sensor data in the guaranteed service class has not yet been transmitted over the wireless network).

As described above, with reference to FIG. 1, the bandwidth of the wireless network may vary or fluctuate due to a number of factors (e.g., device specifications, channel conditions, etc.). However, there may be a minimum guaranteed bandwidth that the wireless network never, or rarely, drops below. In some aspects, the minimum guaranteed bandwidth may be a predetermined value. In other aspects, the minimum guaranteed bandwidth may be determined by the sensor apparatus 300 (e.g., as described in greater detail below). The guaranteed data 322 may provide a threshold (e.g., minimum) data throughput to occupy the minimum guaranteed bandwidth of the wireless network. For example, the data scheduler 320 may allocate a certain amount of sensor data 312 from each of the plurality of sensors 312-318 to fulfill the threshold data throughput requirement.

In some examples, the data scheduler 320 may ensure that each of the plurality of sensors 312-318 is represented by the guaranteed service class. That is, the scheduler 320 may determine an equitable allocation of the minimum guaranteed bandwidth for each of the plurality of sensors 312-318 based on the size and/or frequency of sensor data generated by each of the plurality of sensors 312-318. This ensures that each of the plurality of sensors 312-318 is able to transmit sensor data on a relatively consistent basis (e.g., based on the threshold data throughput).

As noted above, the rate at which each of the sensors 312-318 generates sensor data may vary. Thus, in some examples, the data scheduler 320 may allocate any additional sensor data (e.g., in excess of the guaranteed data 322) to the best effort service class. The best effort data 324 may be transmitted only when additional bandwidth is available (e.g., when the available bandwidth of the wireless network exceeds the minimum guaranteed bandwidth).

The guaranteed data 322 may be stored and/or buffered in the high priority queue 330. For some examples, the guaranteed data 322 stored in the high priority queue 330 is given the highest priority, and is effectively guaranteed to be transmitted by the sensor apparatus 300. The HP pulling engine 350 "pulls" the guaranteed data 322 from the high priority queue 330 to be transmitted via the wireless transceiver 370. More specifically, the HP pulling engine 350 may pull the guaranteed data 322 at a relatively consistent (e.g., steady) rate, based on the minimum guaranteed bandwidth of the wireless network.

In some implementations, the high priority queue 330 may store the guaranteed data 322 in a linked list, wherein each link of the linked list stores a subset of guaranteed data 322 from one of the sensors 312-318. For example, after the HP pulling engine 350 pulls data from a "GPS link" (e.g., corresponding to a subset of guaranteed data 322 associated with the GPS module 312), the GPS link is subsequently added back to the end of the linked list (e.g., so that the next subset of guaranteed data 322 pulled by the HP pulling engine 350 is from a different one of the sensors 312-318). This may ensure that each of the sensors 312-318 of the sensor array 310 has an equal (or relatively equal) opportunity to transmit data via the wireless transceiver 370.

Furthermore, the sensor data stored in the high priority queue 330 may be regularly updated with new (e.g., current) sensor data. Thus, as the high priority queue 330 receives new guaranteed data 322, it may replace old sensor data stored for one or more of the sensors 312-318 with new sensor data from the same sensor(s). For example, if the guaranteed data 322 includes updated sensor data from the GPS module 312, the high priority queue 330 may replace the existing data stored in the GPS link with the newly received sensor data from the GPS module 312. This may ensure that the high priority queue 330 stores only the most current or up-to-date sensor data from the set of guaranteed data 322.

The best effort data 324 may be stored in the low priority queue 340. The best effort data 324 stored in the low priority queue 340 is given a lower priority than the guaranteed data 322 (e.g., stored in the high priority queue 330), and is not guaranteed to be transmitted by the sensor apparatus 300. The sensor data stored in the low priority queue 340 may also be regularly updated with new (e.g., current) sensor data. Thus, as the low priority queue 340 receives new best effort data 324, it may replace old sensor data stored for one or more of the sensors 312-318 with new sensor data from the same sensor(s). This may ensure that the low priority queue 340 stores only the most current or up-to-date sensor data from the set of best effort data 324. In some implementations, the best effort data 324 may also be stored as a linked list (e.g., in the low priority queue 340), wherein each link of the linked list stores a subset of best effort data 324 from a particular one of the sensors 312-318.

The LP pulling engine 360 pulls best effort data 324 from the low priority queue 340, to be transmitted via the wireless transceiver 370, based on the available bandwidth in the wireless network. In some aspects, the LP pulling engine may pull best effort data 324 from the low priority queue 340 at a relatively consistent rate (e.g., which may exceed the minimum guaranteed bandwidth of the wireless network). However, the HP pulling engine 350 may selectively prevent the LP pulling engine 360 from transmitting the best effort data 324 (e.g., via the wireless transceiver 370) based on the available bandwidth in the wireless network. For example, the HP pulling engine 350 may assert a transmit (TX) override 384 signal when the available bandwidth of the wireless network exceeds the minimum guaranteed bandwidth. The LP pulling engine 360 may refrain from forwarding best effort data 324 to the wireless transceiver 370 in response to the TX override signal 384.

The BW detector 380 may detect the available bandwidth of the wireless network based at least in part on incoming and/or outgoing wireless signals from the wireless transceiver 370. In some aspects, the BW detector 380 may receive wireless signals 372 via the wireless transceiver 370, and may measure and/or estimate the bandwidth of the wireless network based on the received wireless signals 372. For example, a received signal strength indicator (RSSI) typically varies in direct proportion to the available bandwidth of the wireless network (e.g., the greater the RSSI, the greater the available bandwidth). Thus, the BW detector 380 may detect the RSSI of the received wireless signals 372 and correlate the RSSI with the available bandwidth of the wireless network at a given time.

In other aspects, the BW detector 380 may monitor an output queue (not shown for simplicity) in the wireless transceiver 370, and may measure and/or estimate the bandwidth of the wireless network based on the state of the output queue. For example, the output queue may begin to saturate (e.g., the amount of buffered data in the output queue may exceed a threshold amount or storage level) when the output rate of the wireless transceiver 370 exceeds the bandwidth of the network. Thus, the BW detector 380 may determine the available bandwidth in the wireless network based at least in part on the saturation level of the output queue.

Still further, in some aspects, the BW detector 380 may determine the minimum guaranteed bandwidth of the wireless network. For example, the BW detector 380 may monitor the available bandwidth of the wireless network over a given period of time to generate a range of bandwidth measurements. The lowest measured bandwidth in the range of bandwidth measurements may correspond to the minimum guaranteed bandwidth for the wireless network. In some implementations, the BW detector 380 may indicate the lowest measured bandwidth (e.g., the minimum guaranteed bandwidth) to the data scheduler 320. Further, in some examples, the BW detector 380 may dynamically adjust the minimum guaranteed bandwidth based on continuously updated bandwidth measurements.

The BW detector 380 may provide bandwidth information 382, indicating the currently available bandwidth of the wireless network, to the HP pulling engine 350. The HP pulling engine 350 may then compare the available bandwidth to the minimum guaranteed bandwidth. If the available bandwidth does not exceed the minimum guaranteed bandwidth, the HP pulling engine 350 may assert the TX override signal 384 to prevent the LP pulling engine 360 from transmitting best effort data 324 via the wireless transceiver 370. If the available bandwidth exceeds the minimum guaranteed bandwidth, the HP pulling engine 350 may deassert the TX override signal 384 to enable the LP pulling engine 360 to continue and/or resume transmitting the best effort data 324 via the wireless transceiver 370.

In this manner, the sensor apparatus 300 is able to consistently transmit the guaranteed data 322 (e.g., at the threshold data throughput), which encompasses sensor data 312 from each of the plurality of sensors 312-318 to fill the minimum guaranteed bandwidth of the wireless network. Moreover, the sensor apparatus 300 may transmit additional sensor data 312 (e.g., best effort data 324) from one or more of the sensors 312-318 if, and when, additional bandwidth is available in the wireless network. Thus, the sensor apparatus 300 may dynamically increase and/or throttle the amount of sensor data transmitted over the wireless network based, at least in part, on the amount of available bandwidth in the wireless network.

Charging Device Example

Figure 4:
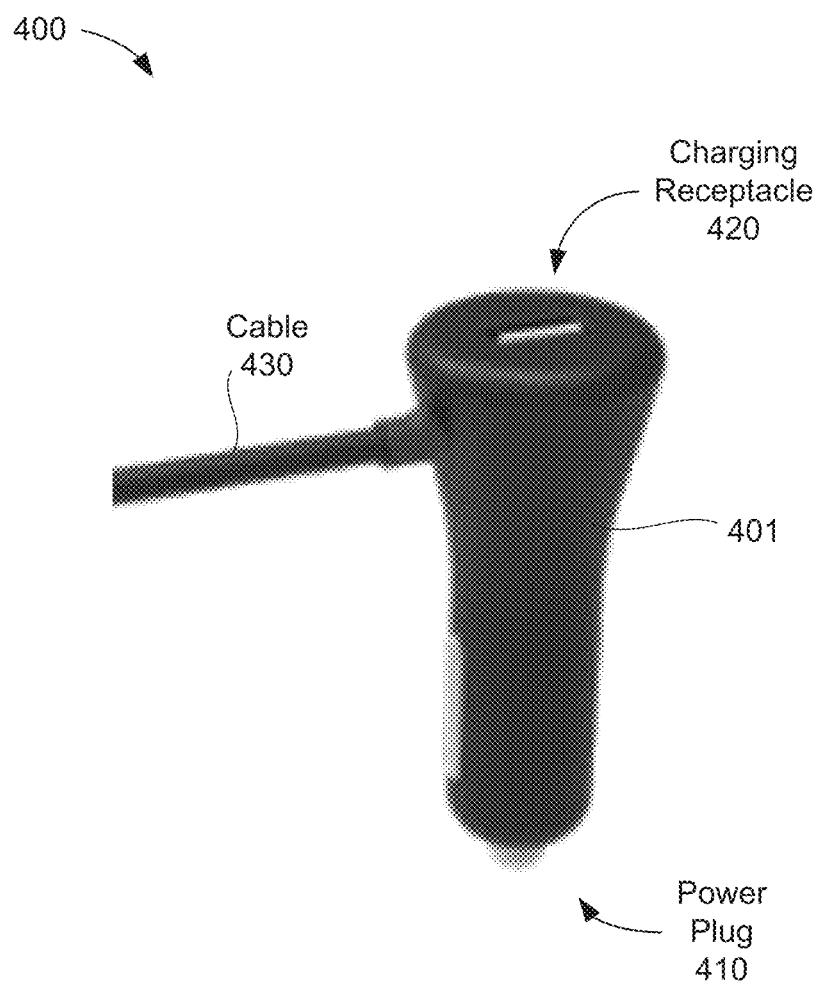
FIG. 4 illustrates an example charging device that can be used to charge a wireless device and/or provide power to a sensor apparatus.

FIG. 4 illustrates an example charging device 400 that can be used to charge a wireless device and/or provide power to a sensor apparatus. The example charging device 400 can correspond to the charging apparatus 200 of FIG. 2. In some examples, the charging device 400 may be connected to (e.g., inserted in) a cigarette lighter receptacle of a vehicle, and may thus draw power from the vehicle via the cigarette lighter receptacle.

As illustrated in FIG. 4, the charging device 400 includes a housing 401, a power plug component 410, a charging receptacle 420, and a cable 430 (additional components may be provided within the housing 401, and are not shown in FIG. 4 for purposes of simplicity). The power plug 410 may form at least part of the lower portion of the housing 401, which is contoured in the shape of a cigarette lighter plug (e.g., to allow the power plug 410 to be inserted in the cigarette lighter receptacle of a vehicle). More specifically, the power plug 410 is configured to couple to, and receive power from, an external power source (e.g., a vehicle battery).

The power plug 410 may draw power from the external power source to supply power to other components of the charging device 400 (e.g., including the charging receptacle 420 and one or more components coupled to the charging device 400 via the cable 430). For example, at least a portion of the power received via the power plug 410 may be routed to the charging receptacle 420 to power and/or charge a device connected to the charging device 400 (e.g., via the charging receptacle 420). In some aspects, the charging device 400 may regulate the amount of current provided to the charging receptacle based, at least in part, on a device type of the connected device.

For example, the charging device 400 may be coupled, via the cable 430, to a sensor apparatus (not shown for simplicity) that communicates wirelessly with the connected device. In some aspects, the charging device 400 may receive device information (e.g., device ID, serial number, MAC address, and/or other identification information) about the connected device from wireless signals received by the sensor apparatus. In other aspects, the charging device 400 may communicate directly with the connected device (e.g., via a wireless transceiver provided within the housing 201). The charging device 400 may determine, based on the received device information, a device type and/or corresponding charge profile for the connected device. The charging device 400 may further determine a device-optimized charging current, via the charging receptacle 420, for the connected device based on the associated charge profile.

In the example of FIG. 4, the charging receptacle 420 is a USB receptacle. As described above, the USB specification defines a standard charging current (e.g., which may vary depending on the version of the USB specification supported by the connected device) that a USB-compliant charger may provide. However, in some aspects, the charging device 400 may provide a high-speed charging current that exceeds the standard charging current defined by the USB specification if the connected device supports such high-speed charging. In other aspects, the charging device 400 may provide an amount of charging current that is less than or equal to the standard charging current defined by the USB specification if the connected device does not support high-speed charging and/or is not recognized by the charging device 400.

Methodology

Figure 5:
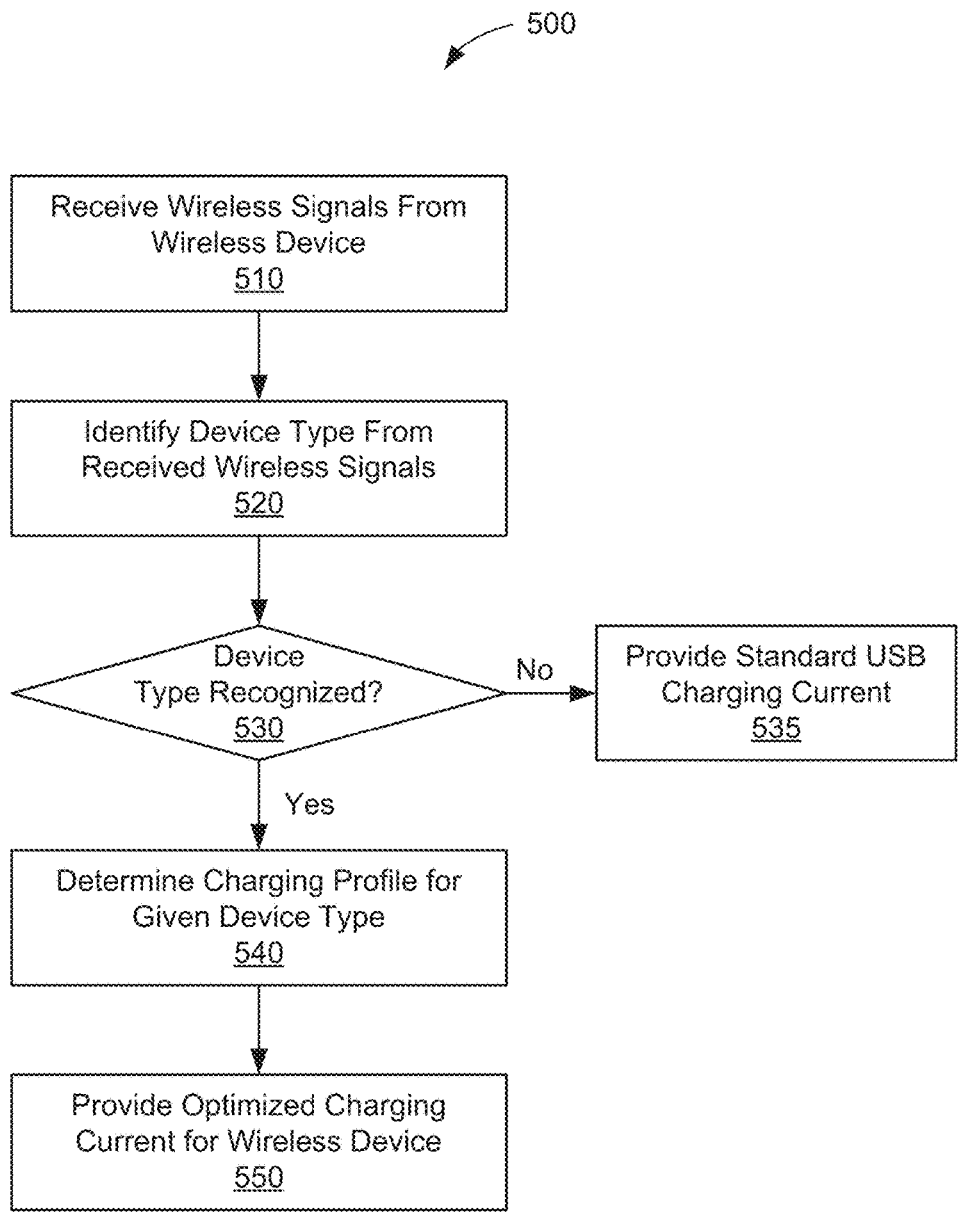
FIG. 5 illustrates an example method for providing a device-optimized charging current to a wireless device.

FIG. 5 illustrates an example method 500 for providing a device-optimized charging current to a wireless device. A method such as described by an example of FIG. 5 can be implemented, for example, by the charging apparatus 200 of FIG. 2. Accordingly, references made to elements of FIG. 2 are for purposes of illustrating a suitable element or component for performing a step or sub-step being described. In example implementations, a wireless device may be coupled to receive power from the charging apparatus 200 via the USB transceiver 230.

The charging apparatus 200 receives a set of wireless signals from the wireless device (510). For example, the charging apparatus 200 may receive the wireless signals 242 via the communications interface 240. In some aspects, the charging apparatus 200 may leverage an existing wireless connection with the wireless device. For example, the wireless device may be in wireless communication with the communications interface 240 to receive sensor data from a sensor apparatus coupled to the charging apparatus 200 (e.g., sensor apparatus 300 of FIG. 3).

The charging apparatus 200 may identify a device type for the wireless device from the received wireless signals (520). For example, the device classifier 250 may identify a type of device that sent the wireless signals 242 based on device information (e.g., device ID, serial number, MAC address, and/or other identification information) included in the received wireless signals 242. In some aspects, the device classifier 250 may look up the device information in the device database 260 to identify the device type 252. For example, the device type 252 may correspond with a particular product, class of products, family of products, and/or any other form of device classification. In some instances, the charging apparatus 200 may not recognize the wireless device. For example, the device classifier 250 may be unable to identify a device type of the wireless device from the received wireless signals 242.

If the charging apparatus 200 does not recognize the device type (530), it may provide a standard USB charging current to the wireless device (535). For example, the device classifier 250 may output a default or null value for the device type 252 it is unable to identify the device type from the received wireless signals 242. This in turn may cause the charge selector 270 to output a default or null value for the charge profile 272, which causes the current regulator 220 to provide a standard charging current to the USB transceiver 230 (e.g., as defined by the USB specification). Because the charging current is defined by the USB specification, it is therefore likely to be supported by the wireless device.

If the charging apparatus 200 recognizes the device type (530), it may then determine a charging profile for that device type (540). For example, the charge selector 270 may select a charge profile 272 that matches the device type 252. In some aspects, the charge selector 270 may look up the device type 252 in the charge profile database 280 to determine the charge profile 272. For example, the charge profile 272 may include current, voltage, and/or other power-related specifications for the given device type 252.

Finally, the charging apparatus 200 deliver an optimize charging current for the wireless device (550). For example, the current regulator 220 may selectively output a device-optimized charging (DOC) current 222 to the wireless device via the USB transceiver 230. In some aspects, the current regulator 270 may output the highest amount of current that the wireless device is capable of supporting (e.g., as indicated by the charge profile 272). In other aspects, the current regulator 220 may enable the connected device to draw a greater amount of current (e.g., based on the charge profile 272) from the USB transceiver 230 than the USB specification would otherwise allow.

The method 500 may be repeated each time the charging apparatus 200 detects and/or is connected to a new wireless device. Accordingly, the method 500 may allow the charging apparatus 200 to adapt to the power and/or charging specifications of any connected device.

Figure 6:
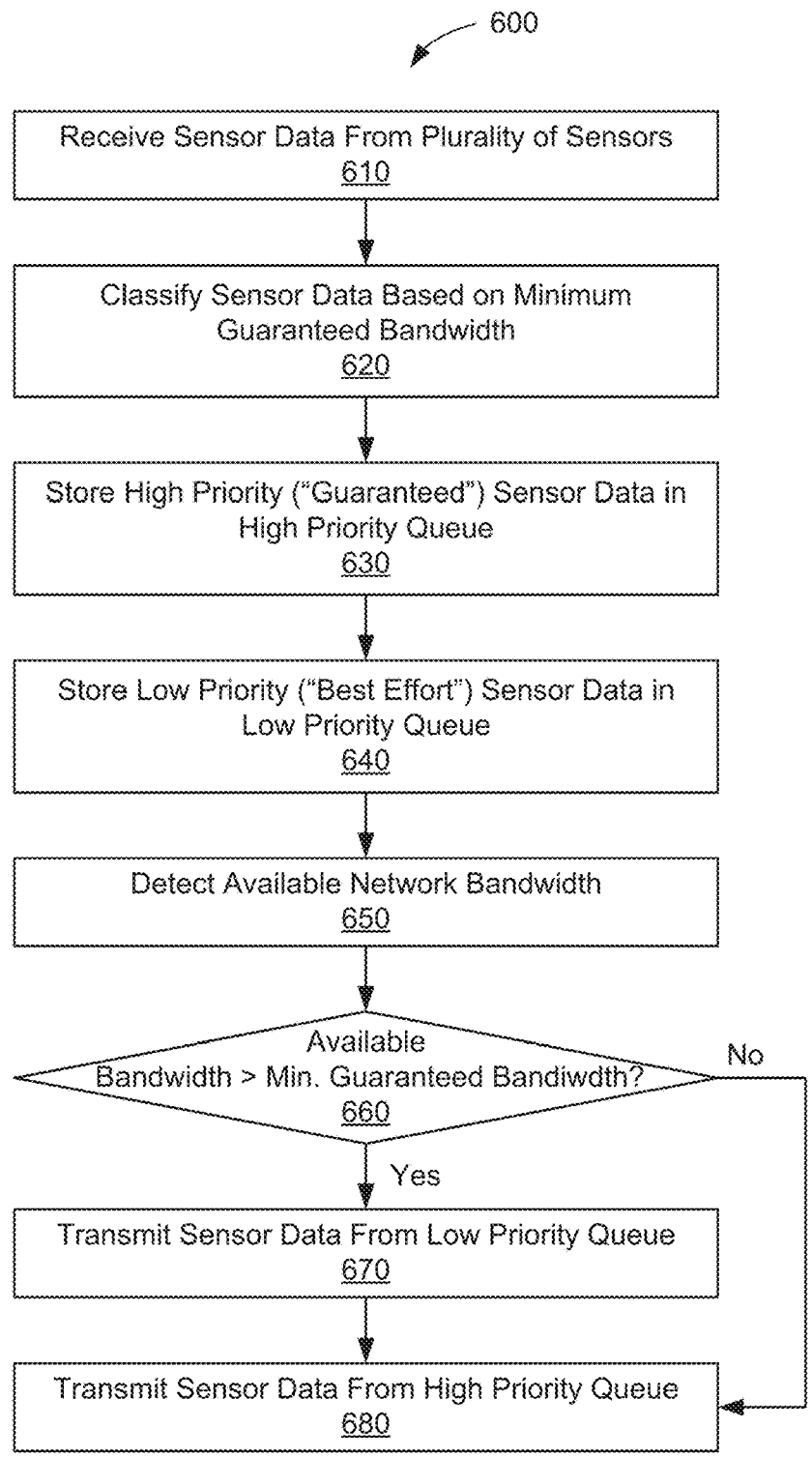
FIG. 6 illustrates an example method for dynamically adjusting the amount and/or type of sensor data to be transmitted to a wireless device.

FIG. 6 illustrates an example method 600 for dynamically adjusting the amount and/or type of sensor data to be transmitted to a wireless device. A method such as described by an example of FIG. 6 can be implemented, for example, by the sensor apparatus 300 of FIG. 3. Accordingly, references made to elements of FIG. 3 are for purposes of illustrating a suitable element or component for performing a step or sub-step being described. In example implementations, the sensor apparatus 300 may transmit sensor data over a wireless network via the wireless transceiver 370.

The sensor apparatus 300 receives sensor data from a plurality of sensors (610). For example, the sensory array 310 may include a plurality of sensors 312-318 that can sense or detect one or more characteristics of their environment and generate sensor data 312 based on the detected characteristics. Each of the plurality of sensors 312-318 may generate its own subset of sensor data 312 with varying data sizes and/or frequencies. In some aspects, one or more sensors may periodically generate new or updated sensor data 312. In other aspects, one or more of the sensors 312-318 may generate updated sensor data 312 only when changes are detected in the surrounding environment.

The sensor apparatus 300 classifies the sensor data based on a minimum guaranteed bandwidth (620). The available bandwidth of the wireless network (e.g., a BLE network) may be relatively low and may vary over time (e.g., due to high susceptibility to noise and/or other channel conditions). However, there may be a minimum guaranteed bandwidth that the wireless network never, or rarely, drops below. The data scheduler 320 may thus classify the sensor data 312 into two or more service classes based on the minimum guaranteed bandwidth. For example, the service classes may include at least a guaranteed service class and a best effort service class.

High priority sensor data is stored in a high priority queue (630). For example, the data scheduler 320 may allocate a portion of the sensor data 312 (e.g., the high priority sensor data) to the guaranteed service class to fill the minimum guaranteed bandwidth of the wireless network. The high priority sensor data (e.g., guaranteed data 322) may be stored and/or buffered in the high priority queue 330. The sensor data in the high priority queue 330 is effectively guaranteed to be transmitted via the wireless transceiver 370. In some implementations, the high priority queue 330 may store sensor data in a linked list, wherein each link of the linked list stores a subset of guaranteed data 322 from one of the sensors 312-318.

Low priority sensor data is then stored in a low priority queue (640). For example, after allocating a portion of the sensor data 312 to the guaranteed service class (e.g., the high priority queue 330 is full and/or already contains high priority sensor data from a particular sensor), the data scheduler 320 may allocate any remaining sensor data 312 (e.g., the low priority sensor data) to the best effort service class. The low priority sensor data (e.g., best effort data 324) may be stored and/or buffered in the low priority queue 340. The sensor data in the low priority queue 340 is not guaranteed to be transmitted via the wireless transceiver 370. In some implementations, the best effort queue 340 may also store sensor data in a linked list, wherein each link stores a subset of best effort data 324 from one of the sensors 312-318.

The sensor apparatus 300 may detect the amount of available bandwidth in the wireless network (650). For example, the BW detector 380 may detect the available bandwidth of the wireless network based at least in part on incoming and/or outgoing wireless signals from the wireless transceiver 370. In some aspects, the BW detector 380 may detect the RSSI of the received wireless signals 372 and may correlate the RRSI with the currently available bandwidth of the wireless network. In other aspects, the BW detector 380 may monitor an output queue in the wireless transceiver 370, and may determine the available bandwidth in the wireless network based at least in part on a saturation level of the output queue. The BW detector 380 may provide bandwidth information 382, indicating the available bandwidth, to the HP pulling engine 350. The HP pulling engine 350 may determine whether the available bandwidth exceeds the minimum guaranteed bandwidth.

If the available bandwidth does not exceed the minimum guaranteed bandwidth (660), the sensor apparatus 300 may only transmit sensor data from the high priority queue (680). For example, the LP pulling engine 360 may be prevented from transmitting best effort data 324 (e.g., by asserting the TX override signal 384) when the available bandwidth does not exceed the minimum guaranteed bandwidth. However, the HP pulling engine 350 may continue to transmit guaranteed data 322. More specifically, the HP pulling engine 350 may pull from the high priority queue 330 at a relatively consistent (e.g., steady) rate, based on the minimum guaranteed bandwidth of the wireless network. In some aspects, the HP pulling engine 350 may ensure that each of the sensors 312-318 of the sensor array 310 has an equal (or relatively equal) opportunity to transmit sensor data over the wireless network.

If the available bandwidth exceeds the minimum guaranteed bandwidth (660), the sensor apparatus 300 may transmit sensor data from the low priority queue (670). For example, the LP pulling engine 360 may be allowed to transmit the best effort data 324 pulled from the low priority queue 340 (e.g., by deasserting the TX override signal 384) when the available bandwidth of the wireless network exceeds the minimum guaranteed bandwidth. Additionally, the sensor apparatus 300 may further transmit sensor data from the high priority queue (680). As described above, the HP pulling engine 350 may pull sensor data from the high priority queue 330 to fill the minimum guaranteed bandwidth of the wireless network. More specifically, the HP pulling engine 350 may continue to transmit guaranteed data 322 regardless of the amount of available bandwidth in the wireless network.

Hardware Diagrams

Figure 7:
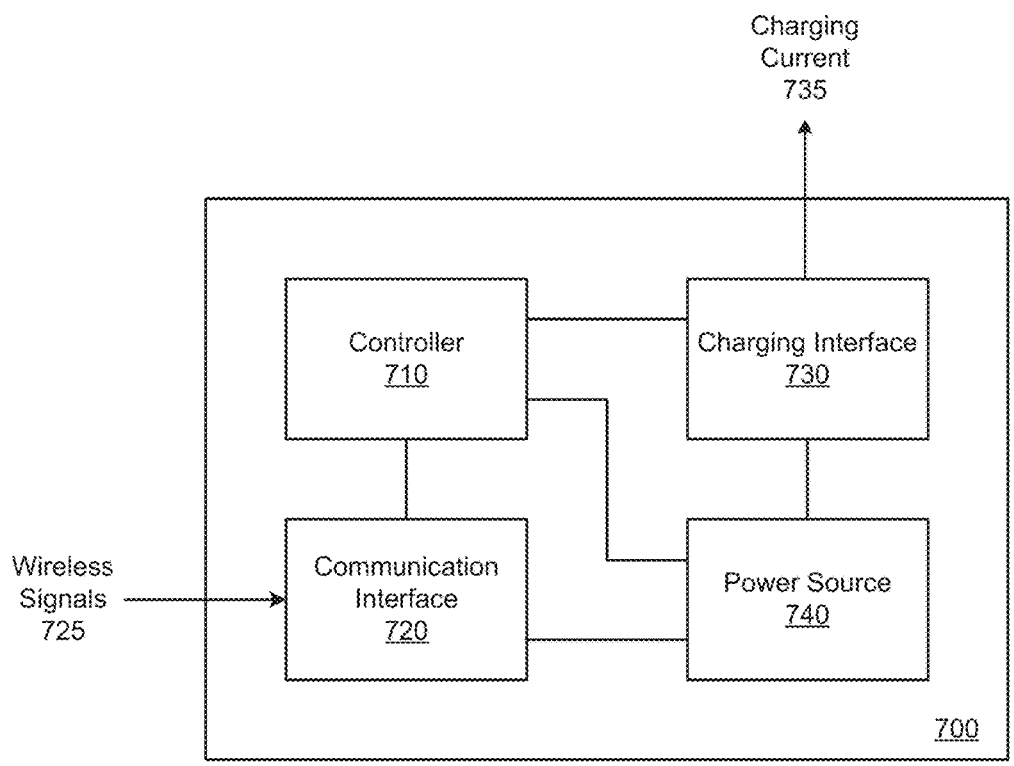
FIG. 7 is a block diagram that illustrates a charging device upon which examples described herein may be implemented.

FIG. 7 is a block diagram that illustrates a charging device 700 upon which examples described herein may be implemented. For example, in the context of FIGS. 1 and 2, a charging apparatus may be implemented using the device such as described by FIG. 7. The charging device 700 can comprise a housing and/or other features (e.g., to couple to and/or receive power from an external power source provided within a vehicle) such as described in the example of FIG. 4.

The power source 740 provides power to the components of the charging device 700. The power source 740 can be an internal power source, such as a battery, and/or an external power source (e.g., provided by a power source of the vehicle of the driver in possession of the indication device 700 or the driver's device). The charging interface 730 can be a wired and/or conductive interface (e.g., a USB interface or receptacle), as described with FIGS. 1, 2 and 4, to output a charging current 735 to power and/or charge a battery of a wireless device connected to the charging device 700 (e.g., via the charging interface).

In some examples, the charging device 700 can receive wireless signals 725 via the communication interface 720 from a wireless device (not shown in FIG. 7). The wireless signals 725 can be provided by the wireless device for purposes of communicating with the charging device 700 and/or one or more devices coupled to the charging device 700 (e.g., such as the sensor apparatus 300 of FIG. 3). For example, the wireless signals 725 may include device information (e.g., device ID, serial number, MAC address, etc.) as described, for example, with respect to FIGS. 1 and 2. The charging device 700 can also include other components (not shown in FIG. 7), such as one or more ports or contacts, one or more sensors (e.g., an INU, a GPS receiver), speakers, one or more switches to turn on or off the charging device 700, etc.

The controller 710 may regulate the amperage of the charging current 735 provided by the charging interface 730 based on the type of device being charged. For example, the controller 710 may identify a device type and/or charge profile of the wireless device based on device information from the received wireless signals 725, as described, for example, with respect to FIGS. 2 and 3. Thus, in some examples, the controller 710 may enable the charging interface 730 to provide a charging current 735 that exceeds a standard charging current defined by the USB specification, and is optimized for the wireless device coupled to the charging interface 730.

Figure 8:
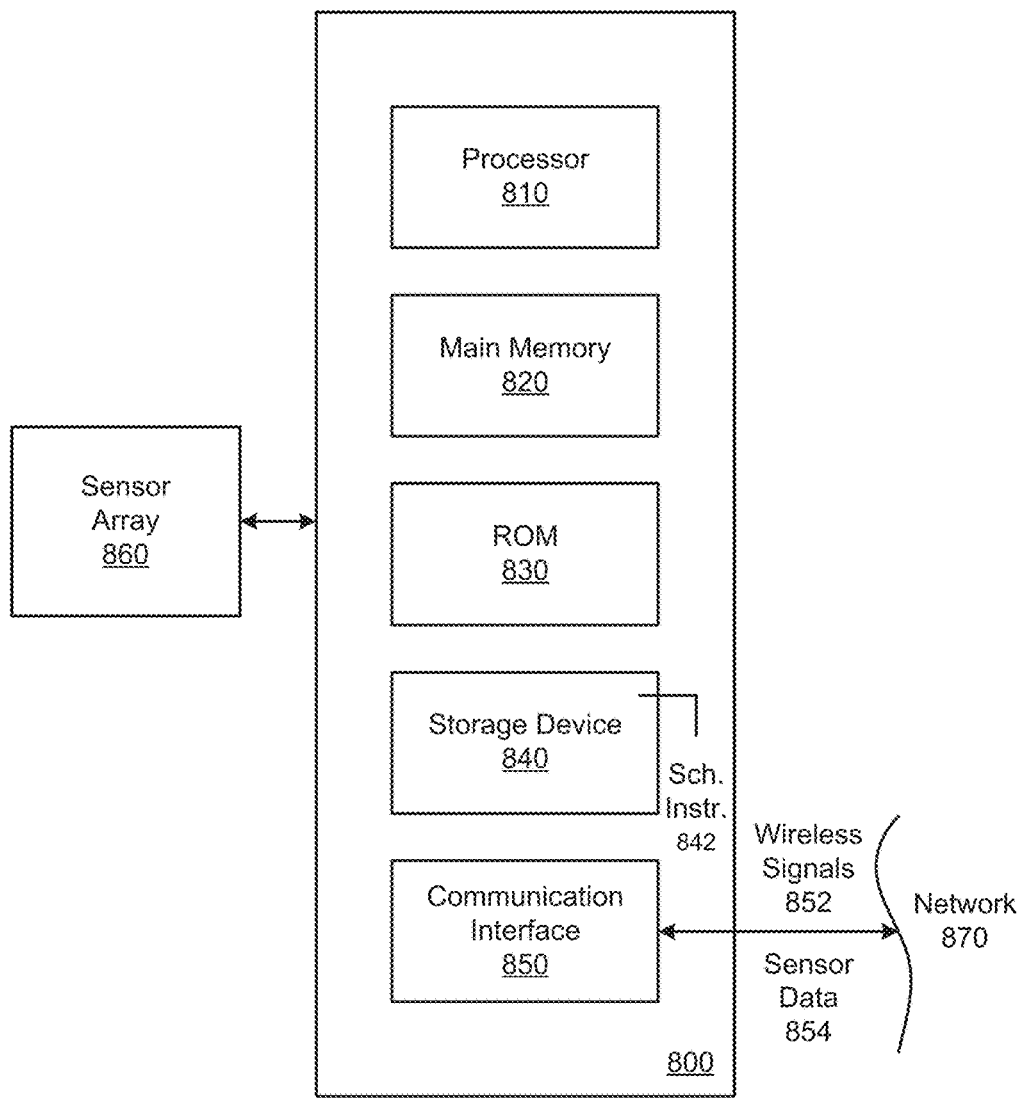
FIG. 8 is a block diagram that illustrates a computer system upon which examples described herein may be implemented.

FIG. 8 is a block diagram that illustrates a computer system 800 upon which examples described herein may be implemented. For example, in the context of FIGS. 1 and 3, the system 100 and/or sensor apparatus 300 may be implemented using a computer system such as described by FIG. 8. The system 100 and/or sensor apparatus 300 may also be implemented using a combination of multiple computer systems as described by FIG. 8.

The computer system 800 can be coupled to and/or include a sensor array 860. For example, the sensor array 860 may include a plurality of sensors that can sense or detect one or more characteristics of their environment and generate sensor data based on the detected characteristics. The computer system 800 may upload sensor data 854 from the sensor array 860 to a server associated with an on-demand service. In example implementations, the computer system 800 transmits the sensor data 854 to a wireless device via a relatively low-bandwidth wireless network (e.g., BLE network), and the wireless device uploads the sensor data 854 to the server via a high-bandwidth wireless network (e.g., cellular or Wi-Fi network). In some examples, the low-bandwidth wireless network may be highly susceptible to interference and/or other channel conditions, which may cause variations in the amount of available bandwidth in the wireless network over time.

In one implementation, the computer system 800 includes processing resources 810, a main memory 820, a read-only memory (ROM) 830, a storage device 840, and a communication interface 850. The computer system 800 includes at least one processor 810 for processing information and a main memory 820, such as a random access memory (RAM) or other dynamic storage device, for storing information and instructions to be executed by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. The storage device 840, which may be a solid-state device, a magnetic disk, or an optical disk, is provided for storing information and instructions. For example, the storage device 840 can correspond to a computer-readable medium that stores scheduling instructions 842 for performing operations discussed with respect to FIGS. 1, 3, and 6. Accordingly, the processor 810 can dynamically adjust (e.g., increase or throttle) the amount of sensor data 854 to be transmitted over a wireless network 870 based on an amount of available network bandwidth at any given time, such as described with respect to FIGS. 3 and 6.

The communication interface 850 can enable the computer system 800 to communicate with the wireless network 870 through use of the network link (e.g., wireless channel). Using the network link, the computer system 800 can communicate with a plurality of wireless devices, such as the mobile computing devices of the service providers. According to some examples, the computer system 800 can receive wireless signals 852 from a wireless device when the user configures and/or operates the wireless device in connection with an on-demand service (e.g., the wireless device is in communication with a server associated with the on-demand service). The processor 810 can detect an amount of available bandwidth in the wireless network 870 based on the received wireless signals 852 (e.g., based on an RSSI of the received signals). If the amount of available bandwidth in the wireless network 870 does not exceed a minimum guaranteed bandwidth for the network 870, the processor 810 may transmit only high priority sensor data over the wireless network 870 (e.g., at a rate or throughput consistent with the minimum guaranteed bandwidth). If the amount of available bandwidth in the wireless network 870 exceeds the minimum guaranteed bandwidth, the processor 810 may transmit low priority sensor data, in addition to the high priority sensor data, over the wireless network 870 (e.g., at a rate or throughput consistent with the amount of additional bandwidth).

Examples described herein are related to the use of the computer system 800 for implementing the techniques described herein. According to one example, those techniques are performed by the computer system 800 in response to the processor 810 executing one or more sequences of one or more instructions contained in the main memory 820, such as the scheduling instructions 842. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A method of wireless data transmission, the method being performed by one or more processors of a computing device and comprising:

receiving sets of sensor data, each set of sensor data being associated with a respective sensor measurement associated with a vehicle;

determining a priority for each of the sets of sensor data based on an amount of data stored for that sensor measurement in a plurality of data queues, including at least a higher priority queue and a lower priority queue;

selectively storing each of the sets of sensor data in one of the plurality of data queues based on a threshold data throughput rate of a wireless network and the priority of each set of sensor data; and transmitting, to a second computing device via the wireless network, at least some of the sets of sensor data from the plurality of data queues based on a current data throughput rate of the wireless network and a priority level of each of the data queues, including transmitting a set of sensor data stored in the lower priority queue when the current data throughput rate exceeds the threshold data throughput rate.

2. The method of claim 1, wherein a first set of sensor data from a first sensor measurement is stored in the higher priority queue when the higher priority queue contains an amount of data for the first sensor measurement that does not exceed a data threshold for the first sensor measurement.

3. The method of claim 2, wherein a second set of sensor data from the first sensor measurement is stored in the lower priority queue when the higher priority queue contains an amount of data for the first sensor measurement exceeding the data threshold for the first sensor measurement.

4. The method of claim 2, wherein, prior to transmitting the first set of sensor data, a third set of sensor data from the first sensor measurement replaces the first set of sensor data in the higher priority queue when the third set of sensor data is an updated version of the first set of sensor data.

5. The method of claim 1, wherein the current data throughput rate of the wireless network varies over time.

6. The method of claim 1, wherein the threshold data throughput rate is a preconfigured value.

7. The method of claim 1, wherein the threshold data throughput rate is a minimum guaranteed rate associated with the wireless network.

8. The method of claim 1, wherein the threshold data throughput rate is determined by a scheduler.

9. The method of claim 1, wherein the wireless network is based on the Bluetooth low energy (BLE) specification.

10. A computing device comprising:
one or more processors; and
one or more memory resources storing instructions that, when executed by the one or more processors, cause the computing device to:
receive sets of sensor data, each set of sensor data being associated with a respective sensor measurement associated with a vehicle;
determine a priority for each of the sets of sensor data based on an amount of data stored for that sensor measurement in a plurality of data queues, including at least a higher priority queue and a lower priority queue;
selectively store each of the sets of sensor data in one of the plurality of data queues based on a threshold data throughput rate of a wireless network and the priority of each set of sensor data; and
transmit, to a second computing device via the wireless network, at least some of the sets of sensor data from the plurality of data queues based on a current data throughput rate of the wireless network and a priority level of each of the data queues, including transmitting a set of sensor data stored in the lower priority queue when the current data throughput rate exceeds the threshold data throughput rate.

11. The computing device of claim 10, wherein a first set of sensor data from a first sensor measurement is stored in the higher priority queue when the higher priority queue contains an amount of data for the first sensor measurement that does not exceed a data threshold for the first sensor measurement.

12. The computing device of claim 11, wherein a second set of sensor data from the first sensor measurement is stored in the lower priority queue when the higher priority queue contains an amount of data for the first sensor measurement exceeding the data threshold for the first sensor measurement.

13. The computing device of claim 11, wherein, prior to transmitting the first set of sensor data, a third set of sensor data from the first sensor measurement replaces the first set of sensor data in the higher priority queue when the third set of sensor data is an updated version of the first set of sensor data.

14. A non-transitory computer-readable medium that stores instructions, executable by one or more processors, to cause the one or more processors to perform operations that comprise:
receiving sets of sensor data, each set of sensor data being associated with a respective sensor measurement associated with a vehicle;
determining a priority for each of the sets of sensor data based on an amount of data stored for that sensor measurement in a plurality of data queues, including at least a higher priority queue and a lower priority queue;
selectively storing each of the sets of sensor data in one of the plurality of data queues based on a threshold data throughput rate of a wireless network and the priority of each set of sensor data; and
transmitting, to a second computing device via the wireless network, at least some of the sets of sensor data from the plurality of data queues based on a current data throughput rate of the wireless network and a priority level of each of the data queues, including transmitting a set of sensor data stored in the lower priority queue when the current data throughput rate exceeds the threshold data throughput rate.

* * * * *